United States Patent [19]

Sumimura

[11] 4,156,674

[45] May 29, 1979

[54] ROOM-TEMPERATURE-CURING SILICONE RUBBER COMPOSITIONS

[75] Inventor: Shinichi Sumimura, Ichihara, Japan

[73] Assignee: Toray Silicone Company, Ltd., Tokyo, Japan

[21] Appl. No.: 917,617

[22] Filed: Jun. 21, 1978

[30] Foreign Application Priority Data

Jul. 8, 1977 [JP] Japan .............................. 52-810447

[51] Int. Cl.$^2$ ............................................. C08L 83/04
[52] U.S. Cl. ......................... 260/37 SB; 260/DIG. 24
[58] Field of Search ..................................... 260/37 SB

[56] References Cited

U.S. PATENT DOCUMENTS

| | | |
|---|---|---|
| 3,652,488 | 3/1972 | Harder .............................. 260/37 SB |
| 3,734,881 | 5/1973 | Shingledecker ................. 260/37 SB |
| 3,840,492 | 10/1974 | Smith et al. ..................... 260/37 SB |
| 4,087,399 | 5/1978 | Hamada et al. ................. 260/37 SB |

FOREIGN PATENT DOCUMENTS

| | | |
|---|---|---|
| 64139 | 9/1973 | Japan. |
| 92452 | 11/1973 | Japan. |
| 20839 | 5/1974 | Japan. |

*Primary Examiner*—Lewis T. Jacobs
*Attorney, Agent, or Firm*—Robert L. McKellar

[57] ABSTRACT

What is disclosed is a room-temperature vulcanizing flame-resistant silicone rubber composition which has triazole compounds added to it to enhance the self-extinguishing character of the flame resistant rubber.

6 Claims, No Drawings

ROOM-TEMPERATURE-CURING SILICONE RUBBER COMPOSITIONS

BACKGROUND OF THE INVENTION

This invention is directed to flame-resistant, room-temperature vulcanizing silicone rubber compositions. More specifically, this invention is directed to the enhancement of the self-extinguishing properties of flame-resistant, room-temperature vulcanizing silicone rubber compositions.

Room temperature vulcanizing silicone rubbers (RTV) are well-known in the art. It is further known that such silicone rubbers can be made flame-resistant. For example, in Kokai Patent Gazette No. Sho 48 (1973)-64139, there is shown a method in which halogenated organic compounds are added to silicone compositions to enhance the flame resistance but these materials are deficient because they tend to give off toxic gases when burned due to the presence of the halogenated organic compounds. Kokai Patent Gazette No. Sho 48 (1973)-92452 shows a method in which platinum compounds are added to silicone compositions but it is shown by testing that platinum addition alone is not sufficient to impart adequate flame-resistance to silicone compositions. Further, it has been shown in Kokai Patent Gazette No. Sho (1973)-20839 that a combination of carbon black, platinum compounds and certain metallic oxides provide flame resistance to silicone compositions but they do not impart high enough flame resistance due to low self-extinguishing characteristics.

For the above reasons, there has been a demand for room-temperature vulcanizing, fire-resistant, self-extinguishing silicone compositions. This demand has been primarily from the electric and electronics industries and in the construction business.

This invention, therefore, offers a room-temperature vulcanizing silicone rubber composition which does not have the problems associated with the prior art compositions and which has in addition excellent self-extinguishing characteristics.

THE INVENTION

The invention is, therefore, directed to a silicone composition of matter which is flame-resistant and has excellent self-extinguishing properties which enhances the overall flame resistance of the composition. The compositions are room temperature vulcanizable, that is, they are curable by the use of catalysts and optionally crosslinkers.

The invention consists of a room-temperature vulcanizable silicone rubber composition consisting essentially of (a) 100 parts by weight of an organopolysiloxane having a viscosity of 0.1 to 100 Pa•s at 25° C. having the general formula

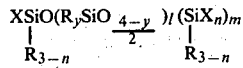

$$XSiO(R_ySiO_{\frac{4-y}{2}})_l(SiX_n)_m$$
$$\underset{R_{3-n}}{|} \qquad \underset{R_{3-n}}{|}$$

wherein X is a hydroxyl group or a hydrolyzable group, R is a monovalent hydrocarbon radical having 1-18 carbon atoms or a cyanoalkyl group, n is 1, 2 or 3, y has an average value between 1.90 and 2.05, m has an average value between 0.95 and 1.10, y+m is equal to 3, l is a positive integer and the total number of X groups in the molecule is at least 3, (b) 0-150 parts by weight of a filler selected from a group consisting of silica and titanium dioxide, or mixtures thereof, (c) 3-200 parts per million parts of component (a), of platinum or an equivalent amount of platinum from a platinum compound, (d) 0.05-60 parts by weight carbon black (e) 0.1-1.5 parts by weight of a triazole, (f) 0-6 parts by weight of a curing catalyst, and (g) 0.5-20 parts by weight of a silicon containing crosslinker which crosslinker has at least 3 Si-bonded hydrolyzable groups, wherein the sum of the weight of components (b)+(d) in the rubber composition must be 5 parts by weight or greater.

The organopolysiloxane component (a) is well known to those skilled in the art and is a linear or branched polysiloxane terminated by hydroxyl groups or hydrolyzable groups. The preparation of these organopolysiloxanes is also well known. In the above formula, X is a hydroxyl radical or a hydrolyzable radical. For purposes of this invention, there may be present on the ends of the siloxane polymer chains, 1, 2 or 3 hydroxyl groups or 1, 2 or 3 hydrolyzable groups bonded to the same silicon atom. The hydrolyzable groups that are useful in this invention are, for example alkoxy groups of 1-4 carbon atoms, acyloxy groups, ketoxime groups, N-substituted amino groups, N-substituted amido groups and N-substituted aminoxy groups. These organopolysiloxanes are the most useful when they have viscosities in the range of 0.1-100 Pa•s at 25° C. If the viscosity is higher, they are inconvenient to use. If they are lower, the elongation of the vulcanizable rubber, after curing, is too low for practical application. Preferred for this invention is a viscosity of 1.0-50 Pa•s at 25° C.

R in the above formula are monovalent hydrocarbon radicals having 1-18 carbon atoms. They can be, for example, aliphatic alkyl groups such as methyl, ethyl, isopropyl hexyl, and octadecyl groups; cycloalkyls such as cyclohexyl, cyclopentyl; alkaryl groups such as benzyl, β-phenylethyl groups; and aromatic hydrocarbon groups such as phenyl, xenyl, naphthyl, tolyl and xylyl.

R may also be a cyanoalkyl group such as β-cyanoethyl, γ-cyanopropyl or β-cyanobutyl. The presence of the same kind of R's in one molecule or the presence of different kinds of R's in one molecule are contemplated by this invention. From the viewpoint of the ease of synthesis, most of, or all the R's should be methyl groups, the remaining groups being vinyl groups or phenyl groups.

Component (b) is added, as required to maintain the viscosity of the composition of this invention within a suitable range, and to achieve the desired mechanical properties of the cured rubber. If silica fillers are to be used, they may be either reinforcing silica fillers or nonreinforcing silica fillers. Examples of the reinforcing fillers include aerosol-type silica, precipitated silica, aerosol-type or precipitated silica hydrophobized with hexamethyldisilazane or trimethylchlorosilane, silica aerogel, and silica xerogel. Examples of nonreinforcing fillers are finely divided quartz fillers such as crushed or pulverized quartz and diatomaceous earth. The examples of titanium dioxide fillers are rutile titanium dioxide, which is usually used as a pigment, anatase form titanium dioxide, and aerosol-type titanium dioxide.

Considering the self-extinguishing properties, aerosol-type titanium dioxide is the most desirable. There can be one of these fillers used in the composition, or more than one may be used in a mixture.

0-150 parts by weight of component (b) may be added to 100 parts by weight of component (a). However, when the addition of component (b) in this case is less than 5 parts by weight, one should also add carbon black, which is component (d), so that the total of component (b) and component (d) reaches at least 5 parts by weight in order to give rubber elasticity to the cured composition.

It should be recognized that the addition of carbon black in some cases leads to semi-conducting or conductive compositions.

Component (c) is indispensable for imparting self-extinguishing characteristics to the cured composition and the amount of platinum based on the weight of component (a) to be added is 3–200 ppm or preferably 10–100 ppm. If the amount is less than 3 ppm, it is not sufficient for imparting fire-resistant characteristics to the composition. If the amount is above 200 ppm, the self-extinguishing character of the composition begins decreasing. Platinum is added as a fine powder, or in the form of platinum powder supported on a carrier such as alumina, silica gel or asbestos. Examples of platinum compounds are chloroplatinic acid, or complexes of chloroplatinic acid with alcohols, ethers, aldehydes or vinylsiloxanes.

In order to sufficiently disperse these platinum or platinum compounds in the compositions, they may be dissolved or dispersed in organic solvents such as isopropanol, ethanol, benzene, toluene, xylene, or in organopolysiloxane oils.

Component (d), with component (c), is indispensable for imparting the self-extinguishing characteristics. Examples of this component are acetylene black, furnace black and lampblack. To gain the self-extinguishing characteristics, a specific surface greater than 10 m$^2$/g and particle diameters between 0.05 and 0.25 micron are desired with these substances. The amount to be added is 0.05 to 60 parts by weight per 100 parts by weight of component (a). In order to impart rubber elasticity to the cured composition, the sum of component (b) and component (d) should be at least 5 parts by weight. In order to insure electrical insulating properties of the cured composition, a suitable amount of component (d), 0.05–2 parts by weight, should be added. When more than 5 parts by weight of component (d) is added, the cured composition should be expected to be semiconductive or conductive.

Component (e) is a component which imparts excellent self-extinguishing character by synergistically acting with component (c) or component (d). The typical triazole compounds are 1,2,3-triazoles, 1,2,4-triazoles, and benzotriazoles.

Examples of 1,2,3-triazole and its derivatives are 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole-4-aldehyde and 4-cyano-1,2,3-triazole.

Examples of benzotriazole and its derivatives are 1-methylbenzotriazole, 5,6-dimethylbenzotriazole, 2-phenylbenzotriazole, 1-hydroxybenzotriazole and methyl benzotriazole-1-carboxylate.

Examples of 1,2,4-triazole and its derivatives are 1-methyl-1,2,4-triazole, 1,3-diphenyl-1,2,4-triazole, 5-amino-3-methyl-1,2,4-triazole, 3-mercapto-1,2,4-triazole, 1-phenyl-1,2,4-triazole-5-one and 1-phenylurazone. Benzotriazole is the most suitable as component (e). If the amount of component (e) to be added to 100 parts by weight of component (a) is less than 0.01 part by weight or more than 1.5 parts by weight, insufficient self-extinguishing character results. Therefore, the amount added should be between 0.01 to 1.5 parts by weight. In order to disperse component (e) in the composition, it may be dissolved in organic solvents such as isopropanol, ethanol, benzene, toluene, xylene, as is the case with component (c).

Component (f) is a catalyst for curing used, when necessary, for the curing of the composition of this invention at room temperature. The component (f) requirement is different in degree depending on the kind of X groups, that is, the type of hydrolyzable groups in the organopolysiloxane, component (a), and on the kind of hydrolyzable groups in component (g). With certain hydrolyzable groups, component (f) is not required at all, while with some other kinds of hydrolyzable groups, the use of component (f) is necessary. The type of active catalyst is different depending on the hydrolyzable groups present. Therefore, the catalyst should be selected and used to best suit the hydrolyzable groups used. Typical examples of the catalyst of component (f) are:

(1) the metal salts of monocarboxylic acids, such as lead 2-ethyloctanoate, dibutyltin diacetate, dibutyltin 2-ethylhexoate, dibutyltin dilaurate, butyltin tri-2-ethylhexoate, iron 2-ethyl-hexoate, cobalt 2-ethylhexoate, manganese 2-ethylhexoate, stannous octanoate, tin naphthenate, tin oleate, tin butyrate, zinc naphthenate, zinc stearate and titanium naphthenate, (2) tetrabutyl titanate, tetraphenyl titanate, tetra-2-ethylhexyl titanate, tetraoctadecyl titanate, triethanolamine titanate, and ethylene glycol titanate; organosiloxytitanium compounds, where an organosiloxy group is bonded with a titanium atom by Si-O-Ti, disclosed by U.S. Pat. No. 3,294,739, and a β-dicarbonyl titanium compound, disclosed by U.S. Pat. No. 3,334,067 which is represented by the general formula

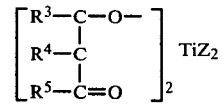

where $R^3$, $R^4$, and $R^5$ are monovalent hydrocarbon groups having 1–18 carbon atoms; and Z is a group selected from monovalent aliphatic hydrocarbon groups and monovalent acyloxy groups (each having 1–18 carbon atoms); a hydroxyl group, or a divalent oxygen atom forming a Ti-O-Ti bond; and, (3) amines such as hexylamine, dodecylamine, amine salts such as hexylamine acetate, dodecylamine phosphate, quaternary ammonia salts such as benzyltrimethylammonium acetate, and salts of alkali metals such as potassium acetate. Of the above-mentioned groups, it is recommended that the tin compounds in (1) not be used whenever possible because they tend to decrease the self-extinguishing character. The remainder of the compounds in group (1) and those in group (2) are desirable for use. When one of these substances is required to be used as a curing catalyst, 0.1–6 parts by weight, or, preferably, 0.1–2 parts by weight of it are added to 100 parts by weight of component (a).

Component (g) functions as a cross-linking agent when the X groups in component (a) are hydroxyl groups. When the X groups are hydrolyzable groups, they make possible the long-term storing of the composition of this invention in the absence of moisture in addition to functioning as a cross-linking agent.

Specific examples of these crosslinking agents are: alkoxy silanes such as tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra(β-chloroethoxy)silane, tetra(2,2,2-trifluoroethoxy)silane, propyltri(δ-chlorobutoxy)silane, methyltris(methoxyethoxy)silane,; alkoxysiloxanes such as ethylpolysilicate, dimethyltetramethoxydisiloxane, acetoxysilanes such as methyltris(acetoxy)silane, vinyltris(acetoxy)silane, phenyltris(acetoxy)silane, methyltris(methyl ethyl ketoxime)silane, vinyltris(methyl ethyl ketoxime)silane, phenyltris(methyl ethyl ketoxime) silane, methyl(diethyl ketoxime)silane, methyltris(cyclohexylamino)silane, methyltris(N-methylacetamide)silane, methyltris(N-butylacetamido)silane, methyltris(N-cyclohexylacetamido)silane, methyltris(N,N-diethylaminoxy)silane,

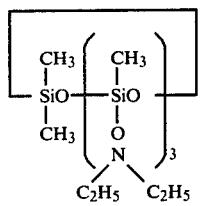
and
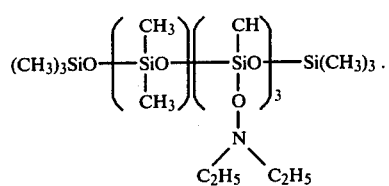

The optimum amount of one of these crosslinkers is selected within the range of 0.5–20 parts by weight per 100 parts by weight of component (a), depending on such factors as whether the composition of this invention is made as a one-package type or a two-package type, whether the X groups of component (a) are hydroxyl groups or hydrolyzable groups, the concentration of the X group in component (a), etc. The hydrolyzable group as the X-group in component (a) is usually desired to be the same as the hydrolyzable group in component (g).

The composition of this invention is obtained by simply combining these components (a), (c), (d), (e), and (g), and, if necessary, (b) and (f). In addition, if necessary, additives usually used with a room temperature vulcanizing silicone rubber, for example, various fillers and pigments such as end-blocked low-molecular weight organopolysiloxanes, calcium carbonate, magnesium oxide, alumina, zinc oxide, iron oxide, fire retardancy agents such as manganese carbonate, azobisisobutyronitrile, adhesion improving agents such as silane coupling agents, may also be incorporated in the compositions of this invention.

This invention is illustrated with the following experimental examples. In these experimental examples, parts and % are all based on weight. The viscosity in these examples is the value at 25° C., with no exceptions. The measurement of self-extinguishing character was carried out on the basis of the UL94V testing method for fire retardancy.

In this test, a silicone rubber sheet obtained by curing the composition is cut to a size of 12.7 cm in length, 1.27 cm in width and 0.32 cm in thickness to be used as a specimen. The specimen is hung vertically in a location free of air currents, and a gas burner flame, 1000 BTU/ft$^3$ is applied to this specimen twice, 10 seconds each time, and the time (sec) required for the flame to be extinguished was measured for each specimen. With each of 5 specimens, the flame-contact test was conducted twice, and the average value for the total of 10 contacts was considered to be the self-extinguishing score (in sec).

EXAMPLE 1

100 Parts of end-blocked polysiloxane consisting of 99.8 mol% dimethylsiloxane units and 0.2 mol% methylvinylsiloxane units (viscosity 10,000 cSt), 100 parts of quartz powder, 5 parts of aerosol-type titanium dioxide, 0.5 parts of 1% solution of chloroplatinic acid in 2-ethylhexanol, 0.3 parts of carbon black, and 8 parts of phenyl triethoxysilane were mixed with each other. Next, four different amounts of 30% benzotriazole solutions in isopropanol were prepared. Each of these solutions was added to a mixture prepared above. Then, after another addition of 0.2 parts of lead 2-ethyloctanoate, bubbles were eliminated from the mixture. The mixture was cured for two days at room temperature to form a sheet. Each sheet obtained was subjected to the self-extinguishing test. The results of the test are shown in Table I.

EXAMPLE 2

Quartz powder a 3% solution of chloroplatinic acid in isopropanol, carbon black, a 30% solution of benzotriazole in isopropanol, and vinyltris(methyl ethyl ketoxime) silane, given in Table II, were mixed with 100 parts of end-blocked dimethylpolysiloxane (viscosity 50,000 cSt). After elimination of the bubbles, the mixture was cured for 7 days at room temperature to form a sheet. The product was subjected to the self-extinguishing test in the same manner as described in Example 1.

The result is shown in Table II along with results for comparative examples. A good result was obtained with the composition of this invention.

EXAMPLE 3

20 parts of carbon black, 0.005 part of chloroplatinic acid, 0.2 parts of benzotriazole, 3 parts of methyltrimethoxysilane and 0.5 parts of bis(acetylacetonyl) diisopropyl titanate were added to 100 parts of dimethylpolysiloxane blocked at both ends with methyldimethoxy groups (viscosity 3500 cSt) and mixed.

This composition could be stored for more than 3 months in a container which did not allow the penetration of moisture. After 3 months, the composition was removed from the container and was cured for 72 hours at room temperature. This cured composition was subjected to the measurement of various physical properties. The results shown in Table III were obtained. For the sake of comparison, a composition obtained without the addition of benzotriazole was also tested, and the results are shown in Table III also.

EXAMPLE 4

100 Parts of a siloxane mixture consisting of 95 parts of methyldi(acetoxy)-group end-blocked polysiloxane (viscosity 15,000 cSt) (composed of 90 mol% dimethylsiloxane units and 10 mol% methylphenyl siloxane units) and 5 parts of dimethyl polysiloxane blocked at both ends having a viscosity of 40 cSt at 25° C. was homogeneously mixed and kneaded with 12 parts of fumed silica having a specific surface of 200 m²/g. The mixture was then heat-treated at 150° C. for 2 hours. After cooling, 0.005 parts of chloroplatinic acid, 0.5 parts of carbon black, and 0.4 parts of benzotriazole powder were added to the mixture and homogeneously mixed with a 3-roll mixer. After the mixture was deaerated, 8 parts of vinyltris(acetoxy)silane were mixed into it. The obtained composition was stored in a container which did not allow the penetration of moisture. This composition did not cure in 3 months of storage at room temperature. After three months of storage, the composition was removed from the container, and was cured for 7 days at room temperature into a sheet. The physical properties of the composition are shown in Table IV.

EXAMPLE 5

In this experiment, the vinyltris(methyl ethyl ketoxime)silane was substituted by methyltris(N-cyclohexylacetamide)silane, methyltris(n-butylamino)silane and methyltris(N,N-diethylaminoxy)silane in order to produce silicone rubber sheets under otherwise exactly the same conditions as those in Example 2. In the self-extinguishing test, all these sheets proved to be excellent in terms of this property, with extinguishment of flame within 10 seconds.

Table 1

| Experiment No. | 30% benzotriazole solution in isopropanol (parts) | Self-extinguishing test score (sec) |
|---|---|---|
| 1 | 0 | 40 |
| 2 | 0.1 | 15 |
| 3 | 1.0 | 8 |
| 4 | 3.0 | 20 |

Experiment No. 1 is a comparative example and Experiment Nos. 2, 3 and 4 are within the scope of this invention.

Table II

| Experiment No. | Dimethylpolysiloxane (parts) | Quartz powder (parts) | Vinyltris-(methylethyl ketoxime)silane (parts) | 30% chloroplatinic acid solution in Isopropanol (parts) | Carbon black (parts) | 30% benzotriazole solution in Isopropanol (parts) | Self-extinguishing test score (sec) |
|---|---|---|---|---|---|---|---|
| 5 | 100 | 100 | 8.0 | 0.2 | 0.5 | 1.0 | 8 |
| 6 | 100 | 100 | 8.0 | 0 | 0 | 0 | completely burned |
| 7 | 100 | 100 | 8.0 | 0.2 | 0 | 0 | completely burned |
| 8 | 100 | 100 | 8.0 | 0.2 | 0.5 | 0 | 40 |
| 9 | 100 | 100 | 8.0 | 0.2 | 0 | 1.0 | 25 |

Experiment Nos. 6, 7, 8 and 9 are comparative examples and Experiment No. 5 is within the scope of this invention.

Table III

| Experiment No. | Hardness | Tensile strength (kg/cm²) | % Elongation | Self-extinguishing test score (sec) |
|---|---|---|---|---|
| 10 | 15 | 12 | 130 | 9 |
| 11 | 15 | 12 | 140 | 25 |

Experiment No. 10 is within the scope of this invention and Experiment No. 11 is a comparative example.

Table IV

| Experiment No. | Hardness | Tensile strength (kg/cm²) | % Elongation | Self-extinguishing test score (sec) |
|---|---|---|---|---|
| 12 | 25 | 23 | 450 | 8 |

Experiment No. 12 is within the scope of this invention.

That which is claimed is:

1. Room-temperature-curing silicone rubber composition consisting essentially of
   (a) 100 parts by weight of an organopolysiloxane having a viscosity of 0.1 to 100 Pa·s at 25° C., having the general formula

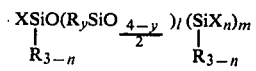

wherein
   X is a hydroxyl group or a hydrolyzable group,
   R is a monovalent hydrocarbon radical having 1-18 carbon atoms or a cyanoalkyl group,
   n is 1, 2 or 3,
   y has an average value between 1.90 and 2.05,
   m has an average value between 0.95 and 1.10,
   y+m is equal to 3,
   l is a positive integer and the total number of X groups in the molecule is at least 3,
   (b) 0-150 parts by weight of a filler selected from a group consisting of silica and titanium dioxide, or mixtures thereof,
   (c) 3-200 parts per million parts of component (a), of platinum or an equivalent amount of platinum from a platinum compound,
   (d) 0.05-60 parts by weight carbon black,
   (e) 0.1-1.5 parts by weight of a triazole,
   (f) 0.6 parts by weight of a curing catalyst, and
   (g) 0.5-20 parts by weight of a silicon containing crosslinker which crosslinker has at least 3 Si-bonded hydrolyzable groups, wherein the sum of the weight of components (b)+(d) in the rubber composition must be 5 parts by weight or greater.

2. The silicone rubber composition of claim 1 wherein X in each case is a hydroxyl group and the silicon bonded hydrolyzable group in component (g) is selected from a group consisting of alkoxy groups of 1-4 carbon atoms, acyloxy group, ketoxime group, N-substituted amino group, N-substituted amido group and N-substituted aminoxy group.

3. The silicone rubber composition of claim 1 wherein X in each case in component (a) and the silicon bonded hydrolyzable group in component (g) is selected from a group consisting of alkoxy groups of 1-4 carbon atoms, acyloxy group, ketoxime group, N-substituted amino group, N-substituted amido group and N-substituted aminoxy group.

4. The silicone rubber composition of claim 1 wherein R in component (a) is selected from a methyl group, phenyl group and a vinyl group.

5. The silicone rubber composition of claim 4 wherein component (c) is chloroplatinic acid.

6. The silicone rubber composition of claim 4 wherein component (e) is benzotriazole.

\* \* \* \* \*